US004001779B2

United States Statutory Invention Registration [19]

[11] Reg. Number: H1779

Watson, Jr. et al.

[45] Published: Feb. 2, 1999

[54] PROCESS AND MATERIAL FOR WARHEAD CASINGS

[75] Inventors: Fred W. Watson, Jr., Montross; J. Wayne Hannock, King George; Robert G. Lam, Spotsylvania; George R. Evans, Woodford, all of Va.

[73] Assignee: The United States of America as represented by the Secretary of the Navy, Washington, D.C.

[21] Appl. No.: 721,308

[22] Filed: Sep. 30, 1996

[51] Int. Cl.[6] ..... B65H 81/00

[52] U.S. Cl. ..... 156/169; 156/175; 102/473; 102/481

[58] Field of Search ..... 102/481, 473; 156/169, 173, 175, 155

[56] References Cited

U.S. PATENT DOCUMENTS

| | | | |
|---|---|---|---|
| H1367 | 11/1994 | Allen, Jr. et al. . | |
| 2,629,894 | 3/1953 | Boggs | 156/175 X |
| 2,751,237 | 6/1956 | Conley | 156/173 X |
| 2,878,038 | 3/1959 | Noland | 156/187 X |
| 3,879,243 | 4/1975 | Medney | 156/155 |
| 4,646,615 | 3/1987 | Gladstone et al. | 89/15 |
| 4,732,634 | 3/1988 | Hill et al. | 156/173 X |
| 4,746,393 | 5/1988 | Ephere et al. | 156/175 X |
| 4,838,166 | 6/1989 | Spies et al. . | |
| 5,035,180 | 7/1991 | Purcell et al. . | |
| 5,035,181 | 7/1991 | Jacks et al. . | |
| 5,035,182 | 7/1991 | Purcell et al. . | |
| 5,060,470 | 10/1991 | VanName . | |
| 5,129,326 | 7/1992 | Brogan . | |
| 5,155,298 | 10/1992 | Koontz . | |
| 5,228,285 | 7/1993 | Van Name et al. . | |
| 5,311,820 | 5/1994 | Ellingsen . | |
| 5,361,703 | 11/1994 | Braithwaite . | |
| 5,369,955 | 12/1994 | VanName et al. | 102/481 X |
| 5,376,200 | 12/1994 | Hall | 156/173 |

*Primary Examiner*—Harold J. Tudor
*Attorney, Agent, or Firm*—James B. Bechtel, Esq.

[57] ABSTRACT

The present invention is a process and material for forming warhead casings. The material itself consists of tightly wound carbon fiber bonded by a low temperature (room temperature) resin. This process of formation gives several advantages, including the ease of manufacturing and the elimination of the need to do inside threading as the interior of the casing can be totally formed during winding of the carbon thread. This also increases the speed of the formation process. The use of carbon thread and low temperature resins also gives several key advantages. First, the low temperature aspect of the resin allows the resulting casing to break down at temperatures significantly less than the ignition point of the munitions held within it. Because the fibers tend to separate as the ambient temperature increases, the casing will auto-ventilate at high temperatures. Additionally, since the casing is formed from carbon fibers, it maintains a high tensile strength while minimizing the weight of the casing.

5 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PROCESS AND MATERIAL FOR WARHEAD CASINGS

The invention described herein was made in the performance of official duties by an employee of the Department of the Navy and may be manufactured, used, licensed by or for the Government for any governmental purpose without payment of any royalties thereon.

FIELD OF THE INVENTION

The invention is related to the ammunitions and explosives field and in particular to insensitive munitions.

BACKGROUND OF THE INVENTION

Ammunition casings, formed from hardened materials, generally stainless steel, have met many of the needs of modern warfare, while failing to meet others. The choice of stainless steel has yielded casings which have a great deal of strength and have been able to withstand the rigors of combat. However, at the same time, stainless steel, as a metal, has several disadvantages.

The main disadvantage of the use of stainless steel casings has been in the reaction of the encased ammunition to heating, including fires within ammunition storage areas. With a hardened shell having a melting point higher than the ignition temperature of the enclosed ammunition, stainless steel casings contain the expanding gases created during ammunition cook-off. When the pressure of the expanding gases is great enough, the casing ruptures explosively, generating explosion damage and metal fragments. In order to preclude a chain reaction of stored munitions, land-based ammunition dumps are typically divided into a series of bunkers separated by sufficient distance to isolate one bunker from another. This type of isolation is not available for shipboard ammunition storage due to the limited available space and due to the proximity of other flammable or explosive materials including fuels, oxygen, high voltage electrical circuits and the like.

Additionally, because of the hardened nature of the stainless steel casings, all machining must be performed after the initial molding of the casing. This means that the interior of a hollow cylindrical casing must be machined using special tools. This process is lengthy and slows the time of manufacture for casings. Finally, although hardened materials, such as stainless steel, provide high tensile strength, this strength comes at the cost of weight. The weight of the casing can affect the ease of transportation of the ammunition itself and the flight characteristics of encased missile weapons.

Numerous other prior art technologies have addressed the problems of munition cook-off on shipboard. For example, U.S. Pat. No. 4,991,513 describes a means for providing vent holes in munition casing using a twisting mechanism to open or close the holes (analogous to opening and closing a salt or pepper shaker).

Each of these prior technologies has resulted in further disadvantages, increased weight, poor sealing of the casing, increased complexity requiring operator action to ready the munition, increased cost and other disadvantages. What is desired is a munition casing having increased strength, lower weight, less cost, while still retaining the insensitive characteristics when subjected to high temperatures or fire.

SUMMARY OF THE INVENTION

It is an object of this invention to provide a casing material capable of breaking down at temperatures less than the ignition point of common explosives.

It is another object of the invention to provide a material which loses structural integrity at high temperatures such that any burning gases within the casing can be safely vented.

It is yet another object of the invention to provide a material which has both a high tensile strength and a low weight.

It is still another object of the invention to provide a process for forming warhead casings from this material which is faster, more efficient and less costly than previous manufacturing processes.

Accordingly, the invention is a carbon fiber-resin munition casing and a process for forming casings through fiber winding which allows the interior of the casing to be formed during casing construction.

BRIEF DESCRIPTION OF THE DRAWINGS

The foregoing objects and other advantages of the present invention will be more fully understood from the following detailed description and reference to the appended drawings wherein.

DETAILED DESCRIPTION OF THE INVENTION

Figure 1:
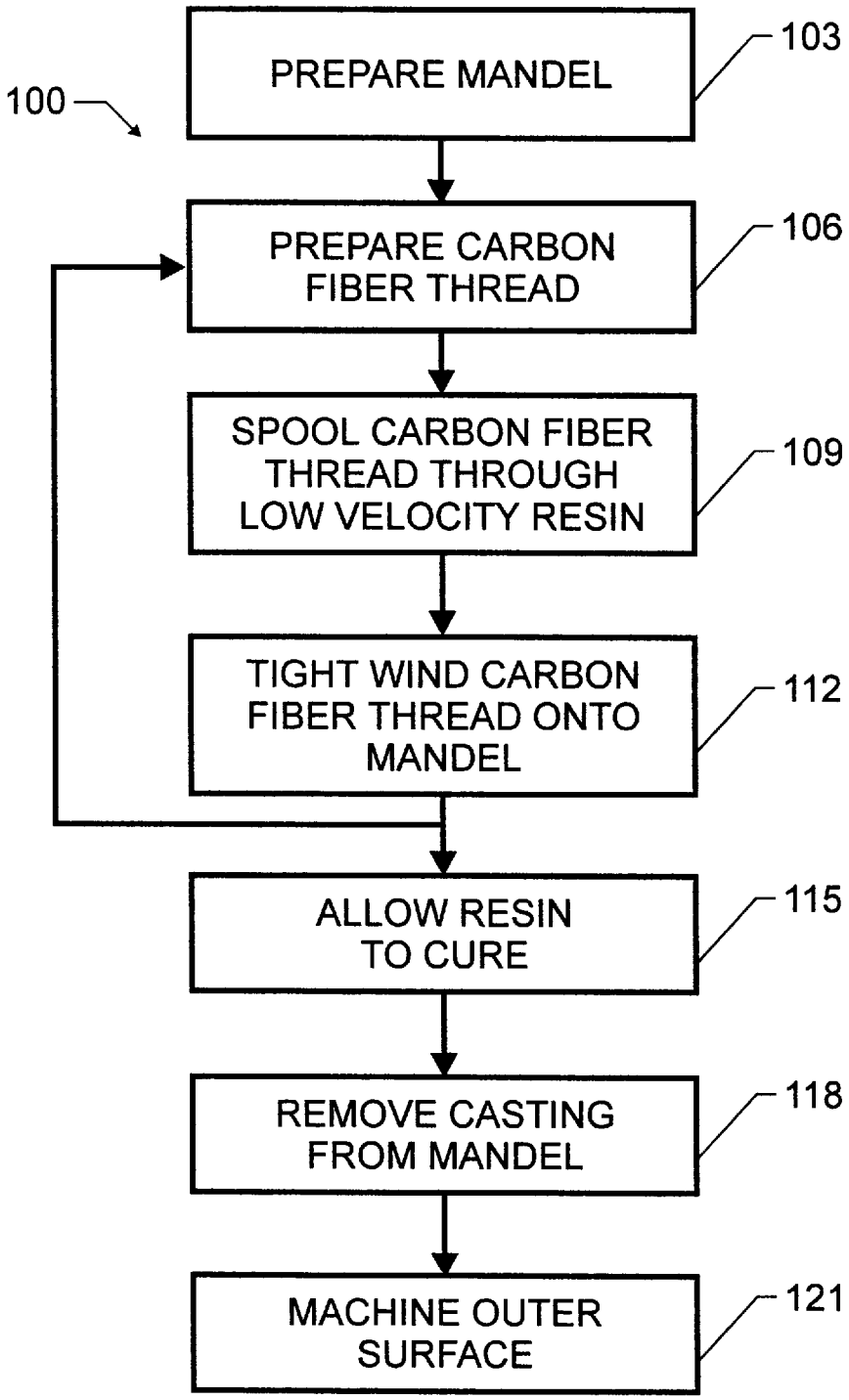
FIG. 1 is a flowchart of the manufacturing process.

Referring now to FIG. 1, the process for manufacturing the casing material, designated generally by the reference numeral 100, is shown with its major steps. In step 103, the mandrel is prepared to accept the spooled carbon fiber. In the present invention, the mandrel acts as a mold, and the exterior shape of the mandrel determines the interior shape of the resulting casing.

In step 106, the carbon fiber thread is prepared. In the preferred embodiment, dual strands with a high filament content were found to provide best results; however, the number of strands wound at once could be changed to suit the specific end product desired. The filament content determines the strength of the resulting material. For high tensile strength applications, including warhead casings, high filament content carbon fibers yield better results.

The prepared carbon thread from step 106 is passed through a low velocity resin in step 109. The type of resin selected will determine the glass transition temperature of the resulting casing. It is important that the ignition temperature of the materials enclosed by the casing exceed the glass transition temperature of the resin. In the preferred embodiment, the 8132 Niteta was found to yield several advantages. First, the glass transition range of the resin was between 200 and 250 degrees Fahrenheit. Additionally, the resin cured at room temperature, thus minimizing the need for special curing procedures. Although 8132 Niteta yielded several key advantages, the use of other similar resins in the manufacturing process would be within the scope of the present invention.

Once the carbon fiber thread has been coated with resin in step 109, it is tightly wound about the mandrel in step 112. The thread must be tightly wound about the mandrel in order to provide strength and the ability to hold the shape of the mandrel after the completion of the manufacturing process. In order to maintain structural integrity of the resulting casing, it is important that the fiber be wound as a continuous thread. Breaking the thread jeopardizes the integrity of the casing formed through the process.

The entire process between steps 106 and 112 may be completed one or more additional times to provide higher tensile strength to the resulting casing. In the preferred embodiment, three separate layers of carbon fiber were used, with the second layer longitudinally, in order to provide tensile strengths exceeding 3000 pounds.

Once the winding steps 106, 109, and 112 have been completed as many times as desired, the completed mold must be allowed to cure and harden in step 115.

The resulting hardened casing is removed from the mandrel during step 118, yielding a finished product. Because the shape of the mandrel can be used to form all inner surfaces including making screw threads, no additional processing is required on the inner surfaces. The outer surfaces of the casing are machined if necessary in step 121, thus yielding a completed finished casing.

This novel method of manufacture allows the windings process to include functions of the internal machining which results in more accurate internal dimensions, faster manufacturing times, and more efficient use of materials. Since the manufacturing process is faster and less complex, manufacturing costs are reduced.

Figure 2:
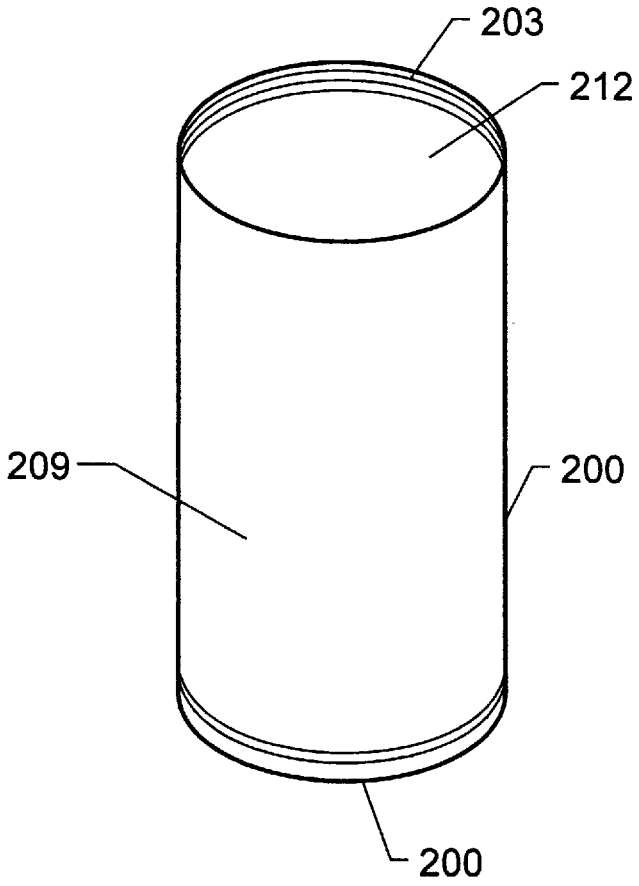
FIG. 2 is a depiction of a warhead casing made from the material of the present invention.

An example of the resulting casing is shown in FIG. 2. Casing 200 is a hollow cylindrical tube approximately six inches in length. Inner surface 212 and outer surface 209 of casing 200 are smooth as a result of the winding and machining process. The thickness of the wall of casing 200 is approximately 1.5 millimeters. Interior screw threads 203 are formed during the winding process. External threads 206 are formed by machining the resulting casing after winding. This particular example, the preferred embodiment of the present invention, combines tensile strengths exceeding 3000 pounds with glass transition and resin breakdown temperatures under 250 degrees Fahrenheit.

Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed as new and desired to be secured by Letters Patent of the United States is:

1. A process for manufacturing a warhead casing comprising the steps of:

machining a mandrel such that an exterior mandrel surface is formed replicating a finished interior surface of a desired warhead casing including internal screw threads;

coating continuous carbon fiber threads with a low viscosity resin to yield resin coated threads;

winding said continuous resin coated threads onto a mandrel to form a warhead casing having finished interior screw threads; and curing and finishing said warhead casing.

2. A process for manufacturing a warhead casing as in claim 1 wherein said step of winding further comprises winding a plurality of threads onto a mandrel in a plurality of separate layers.

3. A process for manufacturing a warhead casing as in claim 1 wherein said low viscosity resin has a glass transition temperature after curing of less than 250 degrees Fahrenheit.

4. A process for manufacturing a warhead casing as in claim 2 wherein said threads have a high level of filament content.

5. A process for manufacturing a warhead casing as in claim 1 wherein said step of curing and finishing further comprises:

allowing the resin to harden;

removing the hardened resin case from the mandrel; and machining the outer surface of said hardened resin case.

* * * * *